United States Patent
Emberty et al.

(10) Patent No.: US 6,537,013 B2
(45) Date of Patent: Mar. 25, 2003

(54) PICKING MECHANISM WITH VENTILATION SYSTEM FOR AUTOMATED LIBRARY OF MEMORY STORAGE UNITS

(75) Inventors: Robert George Emberty, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 09/844,191

(22) Filed: Apr. 26, 2001

(65) Prior Publication Data

US 2002/0159866 A1 Oct. 31, 2002

(51) Int. Cl.[7] .................................................. B65G 1/04
(52) U.S. Cl. ...................... 414/280; 294/65.5; 361/685; 361/695; 360/92; 414/281; 414/661; 454/68; 454/370
(58) Field of Search ................................ 414/273, 277, 414/280, 281, 282, 283, 61; 454/68, 370; 360/92; 361/645, 685; 294/65.5, 902

(56) References Cited

U.S. PATENT DOCUMENTS

| | | | |
|---|---|---|---|
| 4,754,397 A | * 6/1988 | Varaiya et al. | ......... 360/97 XV |
| 5,236,258 A | 8/1993 | Bunch | |
| 5,255,256 A | 10/1993 | Engler et al. | |
| 5,415,471 A | 5/1995 | Dalziel | |
| 5,831,525 A | 11/1998 | Harvey | |
| RE36,286 E | 8/1999 | Hartung et al. | |
| 6,246,579 B1 | * 6/2001 | Lin | ............................ 361/695 |
| 6,359,779 B1 | * 3/2002 | Frank, Jr. et al. | ........... 361/687 |

* cited by examiner

Primary Examiner—Frank E. Werner
(74) Attorney, Agent, or Firm—Jean M. Barkley; Bracewell & Patterson, L.L.P.

(57) ABSTRACT

One embodiment of a picking tool for an automated library of disk drives has an electromagnet, a tapered hole, and a ventilation system. The ventilation system has a box fan with an impeller for moving air through ducting located within the picking tool. The ducting includes a vents located adjacent to one surface of the picking tool. The picking tool is designed to work in conjunction with a disk drive carrier having a front bezel equipped with a tapered guide pin that is complementary to the tapered hole, and vent ports. The guide pin provides alignment between the carrier and the picking tool. The automated disk drive library has a rack with drawers for containing the carriers. The picking tool is mounted to a robotic arm for selectively engaging and interfacing with the carriers. After the picking tool aligns with a desired carrier, the picking tool moves toward the carrier to insert the guide pin into the tapered hole. The disk drive is ventilated by activating the ventilation system to force air through the ducting and vents to cool the disk drive via the vent ports. Ventilation may be performed regardless of the operational status of the disk drive.

20 Claims, 3 Drawing Sheets

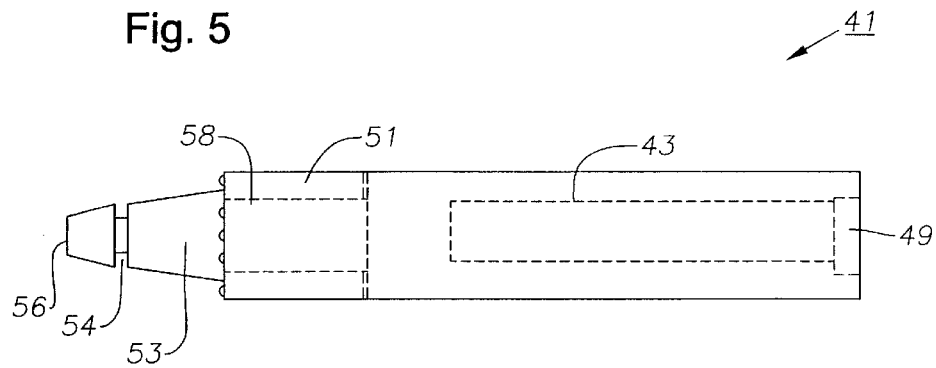
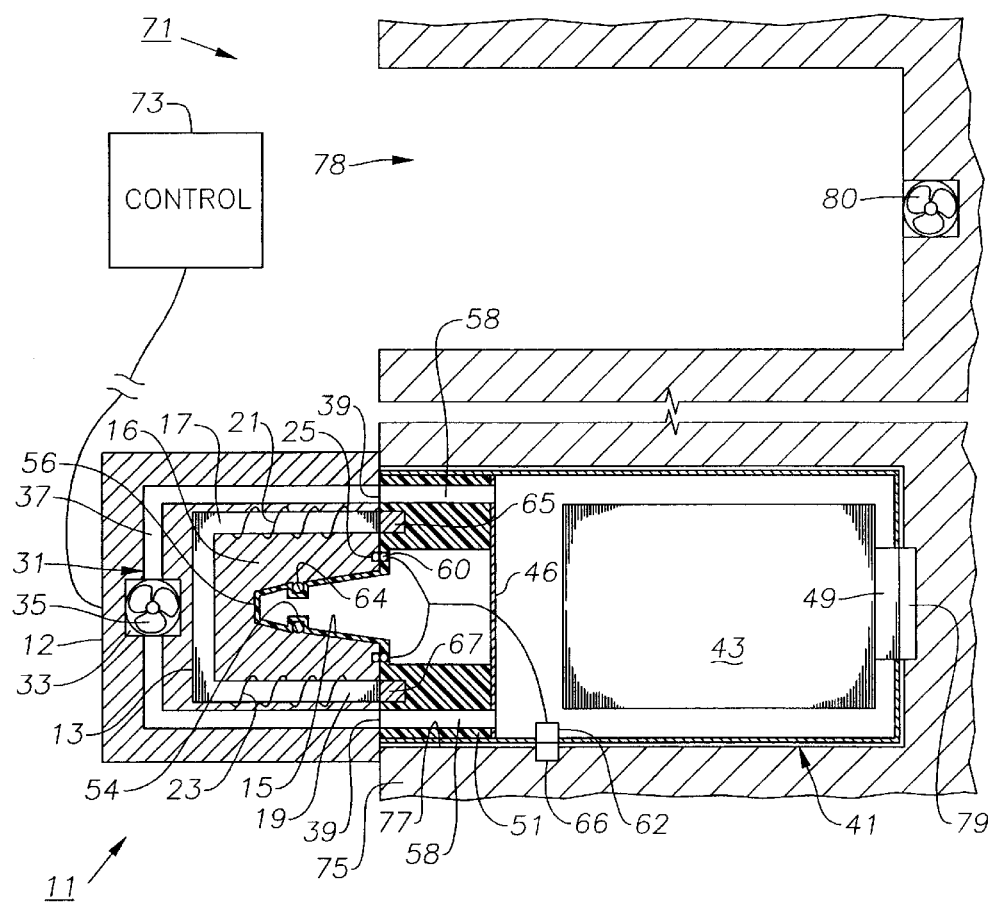

PICKING MECHANISM WITH VENTILATION SYSTEM FOR AUTOMATED LIBRARY OF MEMORY STORAGE UNITS

BACKGROUND OF THE INVENTION

1. Technical Field

The present invention relates in general to an improved picking mechanism for an automated library, and in particular to an improved picking mechanism having a system for ventilating disk drives in an automated disk drive library.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a recordable (e.g., magnetic, optical, etc.) coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. The base casting may be mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

Electromechanical components naturally generate heat while in operation. Some electrical components, such as integrated circuits, are thermally sensitive and must be ventilated or cooled while they are in operation to avoid damage. For example, when a disk drive is interfacing with a computer system to perform input and output, the computer system and disk drive are often ventilated with forced-convection cooling via a ventilation fan and the like. However, when the forced-convection cooling is terminated, the heat generated by the disk drive builds up internally and typically results in a temporary elevation in disk drive temperature before the disk drive ultimately cools down. This type of thermal cycling could reduce the life of the disk drive if it is not properly cooled down.

SUMMARY OF THE INVENTION

One embodiment of a picking tool for an automated library of disk drives has an electromagnet, a tapered hole, and a ventilation system. The ventilation system has a box fan with an impeller for moving air through ducting located within the picking tool. The ducting includes a vent located adjacent to one surface of the picking tool. The picking tool is designed to work in conjunction with a disk drive carrier having a front bezel equipped with a tapered guide pin that is complementary to the tapered hole, and vent ports. The guide pin provides alignment between the carrier and the picking tool.

The automated disk drive library has a rack with drawers for containing the carriers. The picking tool is mounted to a robotic arm for selectively engaging and interfacing with the carriers. After the picking tool aligns with a desired carrier, the picking tool moves toward the carrier to insert the guide pin into the tapered hole. The disk drive is ventilated by activating the ventilation system to force air through the ducting and vents to cool the disk drive via the vent ports. Ventilation may be performed regardless of the operational status of the disk drive.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 5 is a sectional side view of the disk drive carrier of FIG. 3.

FIG. 6 is a sectional top view of the picking tool of FIGS. 1–2 engaged with the disk drive carrier of FIGS. 3–5 in an automated disk drive library.

DETAILED DESCRIPTION OF THE PREFERRED EMBODIMENT

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

Figure 1:
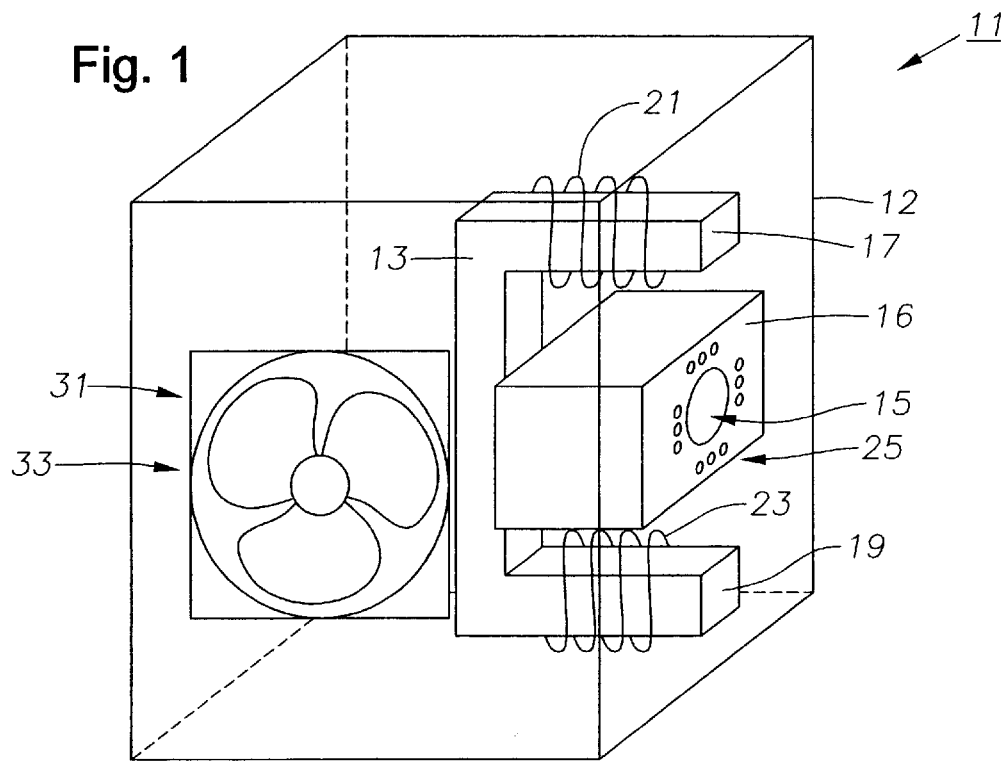
FIG. 1 is an isometric view of one embodiment of a picking tool constructed in accordance with the present invention.

FIG. 1 is an isometric view of one embodiment of a picking tool constructed in accordance with the present invention.

Figure 2:
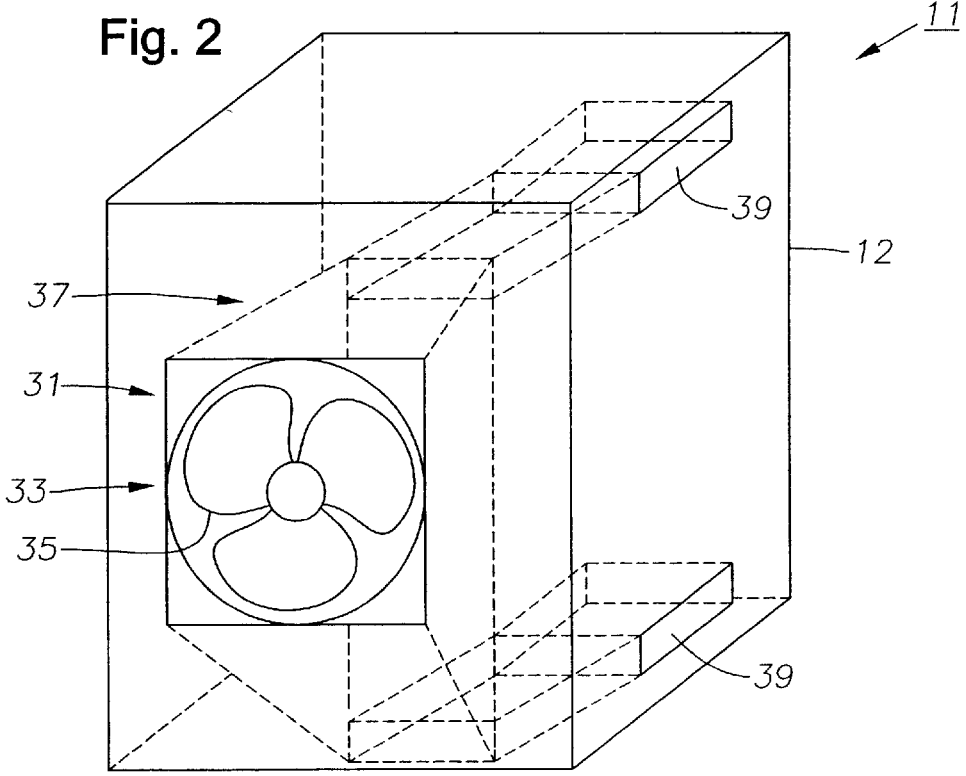
FIG. 2 is an isometric view of the picking tool of FIG. 1 illustrating a ventilation system thereof.

FIG. 2 is an isometric view of the picking tool of FIG. 1 illustrating a ventilation system thereof.

Figure 3:
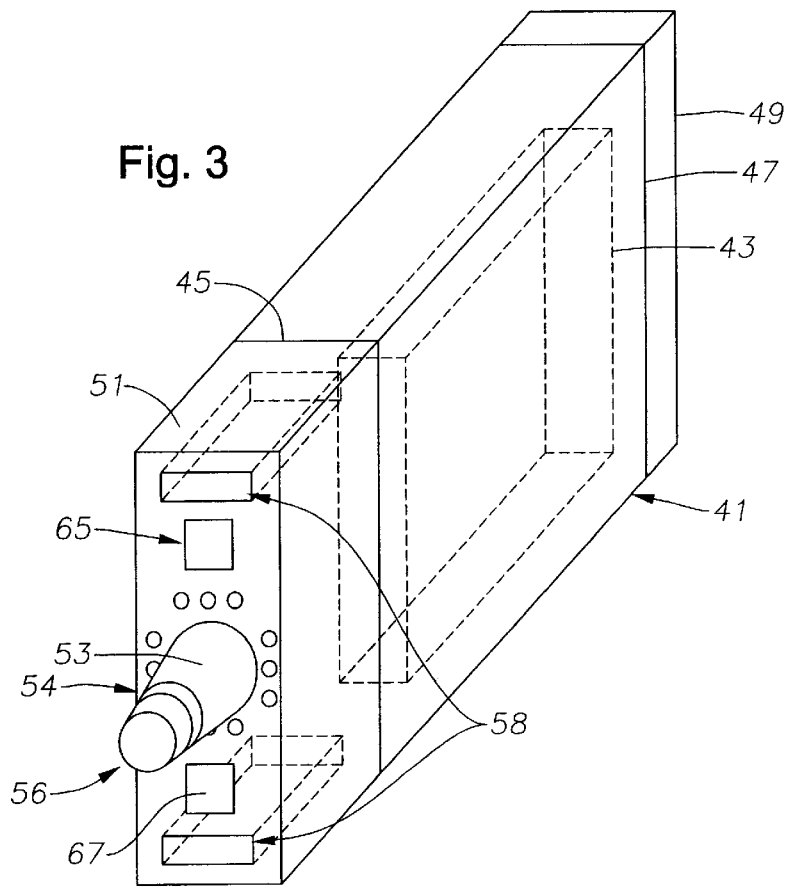
FIG. 3 is an isometric view of one embodiment of a disk drive carrier constructed in accordance with the present invention.

FIG. 3 is an isometric view of one embodiment of a disk drive carrier constructed in accordance with the present invention.

Figure 4:
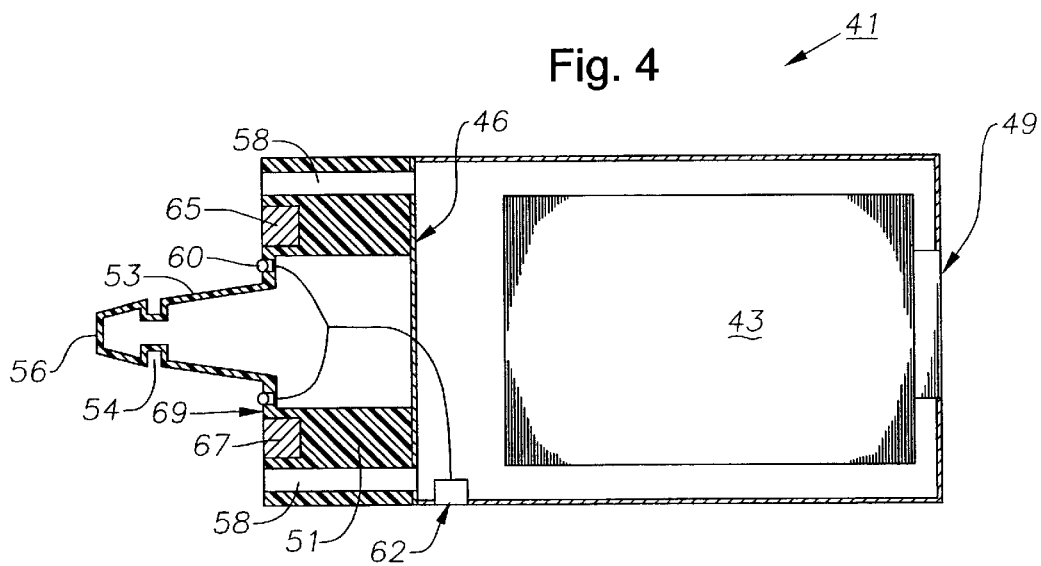
FIG. 4 is a sectional top view of the disk drive carrier of FIG. 3.

FIG. 4 is a sectional top view of the disk drive carrier of FIG. 3.

FIG. 5 is a sectional side view of the disk drive carrier of FIG. 3.

FIG. 6 is a sectional top view of the picking tool of FIGS. 1–2 engaged with the disk drive carrier of FIGS. 3–5 in an automated disk drive library, has its own backplane, the servicing of I/O requests are much faster than if picking tool 11 physically picked up carrier 41 and carried it to a separate part of library 71 which had a backplane.

If desired or necessary, disk drive 43 may be ventilated by activating ventilation system 31. When ventilation system 31 is operating, fan 33 can force air through ducting 37 in either direction (i.e., either into or out of carrier 41), thereby cooling disk drive 43. This ventilation sequence may be performed regardless of the operational status of disk drive 43. Thus, a cool-down period for disk drive 43 may be established even if connector 49 is interconnected with backplane connector 79 and all workload has ceased. The cool-down period may be linked to (i) the thermal time constant of disk drive 43, and/or (ii) the input/output (I/O) workload to disk drive 43. The reason for linking the cool-down period to the I/O workload is that if the I/O workload is small, then no cool-down period would be advisable before putting the disk drive 43 into storage cell 78. Alternatively, cooling is provided to disk drive 43 via an auxiliary ventilation system 80 in storage cell 78. However, this option may comprise cooling many disk drives 43 that have not been recently exposed to an I/O workload.

Ideally, ventilation system 31 in picking tool 11 provides the cooling process for disk drive 43 once carrier 41 is removed from backplane connector 79 in drawer 77. In this way, picking tool 11 cools-down disk drive 43 as carrier 41 is removed from drawer 77 and transported to a desired destination. Carrier 41 is removed from drawer 77 when controller 73 activates electromagnets 17, 19 to attract magnets 65, 67, respectively. Since guide pin 53 is closely received by the tapered hole 15, picking tool 11 can firmly and precisely withdraw carrier 41 and move it to another location. Guide pin 53 supports the majority of the side loads that picker tool 11 is subjected to while carrier 41 is being moved from slot to slot within library 71. In other words, electromagnets 17, 19 provide horizontal support for carrier 41, and guide pin 53 provides vertical support for carrier 41. The electromagnetic poles of picking tool 11 only have to hold in the plane of inserting and extracting a carrier 41 relative to a drawer 77, which is normally a slower operation than a slot-to-slot transport of a carrier 41 within the library 71. This configuration lessens the possibility of a carrier 41 being dropped by picking tool 11. After picking tool 11 arrives at the desired location and carrier 41 is aligned with and inserted into a drawer 77, controller 73 releases carrier 41 from picking tool 11 by reversing the current through coils 21, 23, such that electromagnets 17, 19 on picking tool 11 repel magnets 65, 67. Guide pin 53 then smoothly withdraws from hole 15 by backing picking tool 11 away from carrier 41.

The present invention has several advantages. The ventilation system in the picking tool provides the cooling process for the disk drive once the carrier is removed from the backplane connector. The picking tool cools-down the disk drive as the carrier is removed from the drawer and transported to a desired destination. The ventilation sequence may be performed regardless of the operational status of the disk drive. Alternatively, cooling is provided to the disk drive via the separate ventilation system in the storage cells. The picker assembly allows not only for movement of the drive carriers within the library, but also allows for the system to issue diagnostic commands for automated or "call home" type analysis or problematic drives. The drives may be analyzed even if their backplane data connection is faulty or failing. These problematic drives can then be removed by the picker from the drawer slot and replaced with fully functional spare drives stored elsewhere within the library.

While the invention has been shown or described in only some of its forms, it should be apparent to those skilled in the art that it is not so limited, but is susceptible to various changes without departing from the scope of the invention. For example, the picking tool and disk drive carriers may be provided with optical service interfaces for optical I/O operations.

In addition, the means for grasping the disk drive as taught in FIGS. 1–6 is the preferred means. However, other means for grasping the disk drive may include end effectors such as those described in U.S. Pat. Nos. 5,460,476; 5,362,192; or 5,631,785. In the alternate embodiments taught in these patents, the picker still has ventilating means 31, 33, 35, or utilizes Peltier cooling for removing heat from the disk drive.

What is claimed is:

1. A system for interfacing with and handling disk drives in an automated library having a drawer with a drawer connector, the system comprising:

a disk drive carrier having a disk drive mounted thereto, a backplane connector adapted to interconnect with the drawer connector, wherein the disk drive carrier is adapted to be inserted into the drawer;

a picking tool having securing means for securing the disk drive carrier to the picking tool and a ventilation system for ventilating the disk drive carrier;

control means for controlling the picking tool and communicating information with the disk drive through the backplane connector via the drawer connector, such that the picking tool is adapted to remove the disk drive carrier from the drawer, transport the disk drive carrier, and place the disk drive carrier in the drawer.

2. The system of claim 1 wherein the ventilation system of the picking tool utilizes a fan for forcing air through ducting and vents in the picking tool.

3. The system of claim 1 wherein the ventilation system of the picking tool utilizes Peltier cooling.

4. The system of claim 1 wherein the disk drive carrier has vents.

5. The system of claim 1 wherein the picking tool has a hole that is engaged by interface means on the disk drive carrier.

6. The system of claim 5 wherein the interface means is a tapered guide pin.

7. The system of claim 5 wherein the securing means provides horizontal support for the disk drive carrier, and the interface means provides vertical support for the disk drive carrier.

8. The system of claim 1 wherein the disk drive carrier is attracted to and repelled from the picking tool by reversibly actuating the securing means.

9. The system of claim 8 wherein the securing means of the picking tool is an electromagnet.

10. The system of claim 1 wherein the disk drive carrier and the picking tool each have an interface connector for directly interfacing with each other apart from the backplane and drawer connectors.

11. The system of claim 1 wherein the ventilation system of the picking tool can ventilate the disk drive carrier regardless of a connection status between the backplane and drawer connectors.

12. The system of claim 1, further comprising an auxiliary ventilation system in the drawer for ventilating the disk drive carrier.

13. An automated disk drive library, comprising:

a drawer having a drawer connector;

a disk drive carrier for insertion into and removal from the drawer, the disk drive carrier having a disk drive mounted thereto, a backplane connector for interconnecting with the drawer connector, an interface connector, and vents;

a picking tool having securing means for securing the disk drive carrier to the picking tool, interfacing means for interfacing with the interface connector, and a ventilation system for ventilating the disk drive carrier;

control means for controlling operations of the picking tool and communicating information with the disk drive through both the backplane connector via the drawer connector, and the interface means via the interface connector, such that the picking tool can remove the disk drive carrier from the drawer, transport the disk drive carrier, and place the disk drive carrier in the drawer; and wherein the ventilation system of the picking tool can ventilate the disk drive carrier when the backplane and drawer connectors are connected and disconnected.

14. The automated disk drive library of claim 13 wherein the ventilation system of the picking tool utilizes a fan for forcing air through ducting and vents in the picking tool.

15. The automated disk drive library of claim 13 wherein the ventilation system of the picking tool utilizes Peltier cooling.

16. The automated disk drive library of claim 13 wherein the disk drive carrier is attracted to and repelled from the picking tool by reversibly actuating the securing means.

17. The automated disk drive library of claim 13 wherein the securing means of the picking tool utilizes electromagnets that selectively attract and repel the disk drive carrier via magnets secured to the disk drive carrier.

18. The automated disk drive library of claim 13 wherein the picking tool has a tapered hole through which a tapered pin on the disk drive carrier extends, and wherein the tapered hole and tapered pin are complementary in shape.

19. The automated disk drive library of claim 18 wherein the securing means provides horizontal support for the disk drive carrier, and the tapered pin and hole provide vertical support for the disk drive carrier.

20. The automated disk drive library of claim 13, further comprising an auxiliary ventilation system in the drawer for ventilating the disk drive carrier.

* * * * *